April 30, 1940.     D. S. HERSEY     2,199,259
MANIFOLD PRESSURE EQUALIZER
Filed Sept. 18, 1937     2 Sheets-Sheet 1
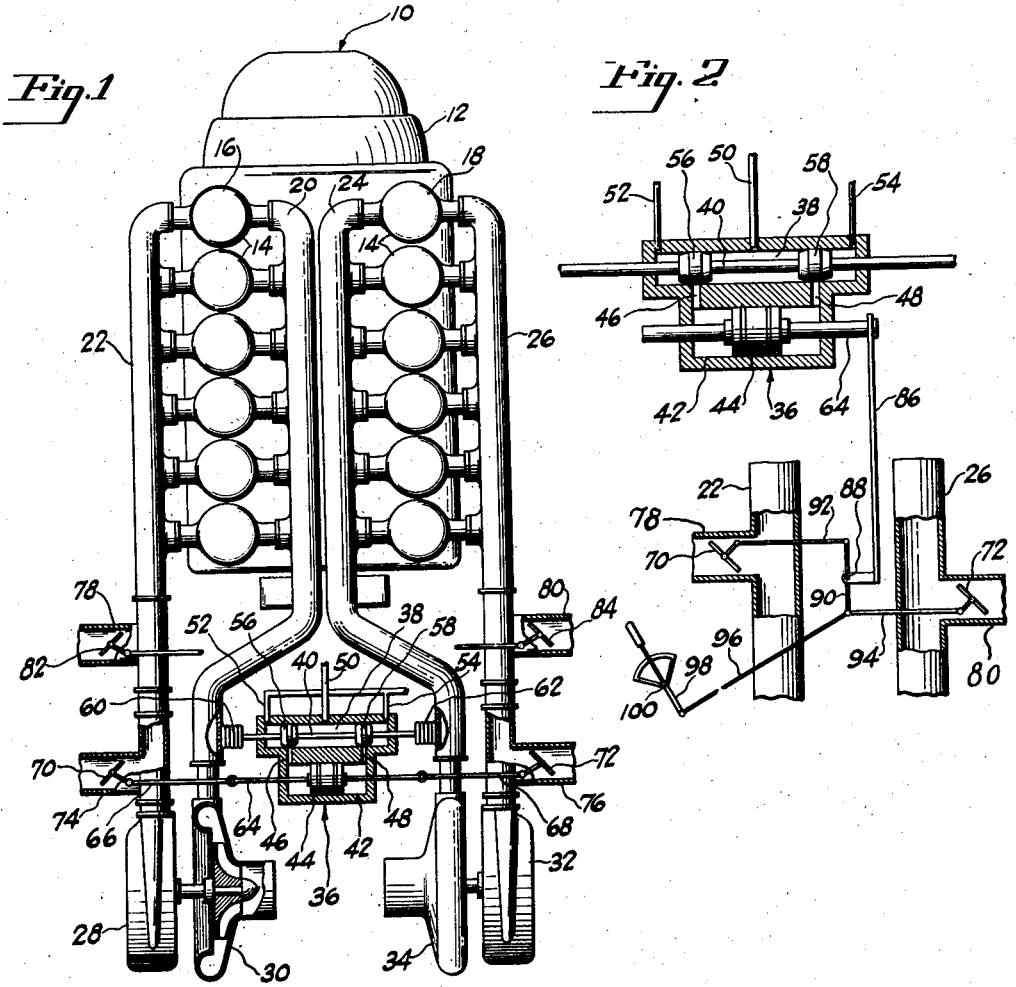
INVENTOR.
Donald S. Hersey
BY Harris G. Luther
ATTORNEY April 30, 1940.     D. S. HERSEY     2,199,259
MANIFOLD PRESSURE EQUALIZER
Filed Sept. 18, 1937     2 Sheets-Sheet 2

INVENTOR.
Donald S. Hersey
BY Harris G. Luther
ATTORNEY

Patented Apr. 30, 1940

2,199,259

UNITED STATES PATENT OFFICE 2,199,259

MANIFOLD PRESSURE EQUALIZER

Donald S. Hersey, West Hartford, Conn., assignor to United Aircraft Corporation, East Hartford, Conn., a corporation of Delaware Application September 18, 1937, Serial No. 164,512

13 Claims. (Cl. 60—13)

This invention relates to improvements in internal combustion engines and has particular reference to improvements in intake control means for such engines.

An object of the invention resides in the provision of an improved method and apparatus for causing two or more engine cylinders or groups of engine cylinders to operate at substantially the same power output.

A further object resides in the provision of control means for controlling the relative fluid pressure of fluid flow in two or more manifolds to maintain the pressure or flow in all of the manifolds substantially equal.

Other objects and advantages will be more particularly pointed out hereinafter or will become apparent as the description proceeds.

In the accompanying drawings in which like reference numerals are used to designate similar parts throughout, there is illustrated in three slightly varied forms a suitable mechanical embodiment of the invention in what is now considered to be the preferred form. The drawings, however, are for the purpose of illustration only and are not to be considered as limiting the invention, the scope of which is to be measured by the scope of the appended claims.

In the drawings Fig. 1 is a schematic top-plan view of an internal combustion engine showing a control means incorporating this invention, the various elements of the control means being broken away and shown in section to better illustrate the construction thereof.

Fig. 2 is a schematic view on a somewhat enlarged scale of the control means illustrated in Fig. 1 showing the application thereto of a manually operated adjusting means.

Figure 3:
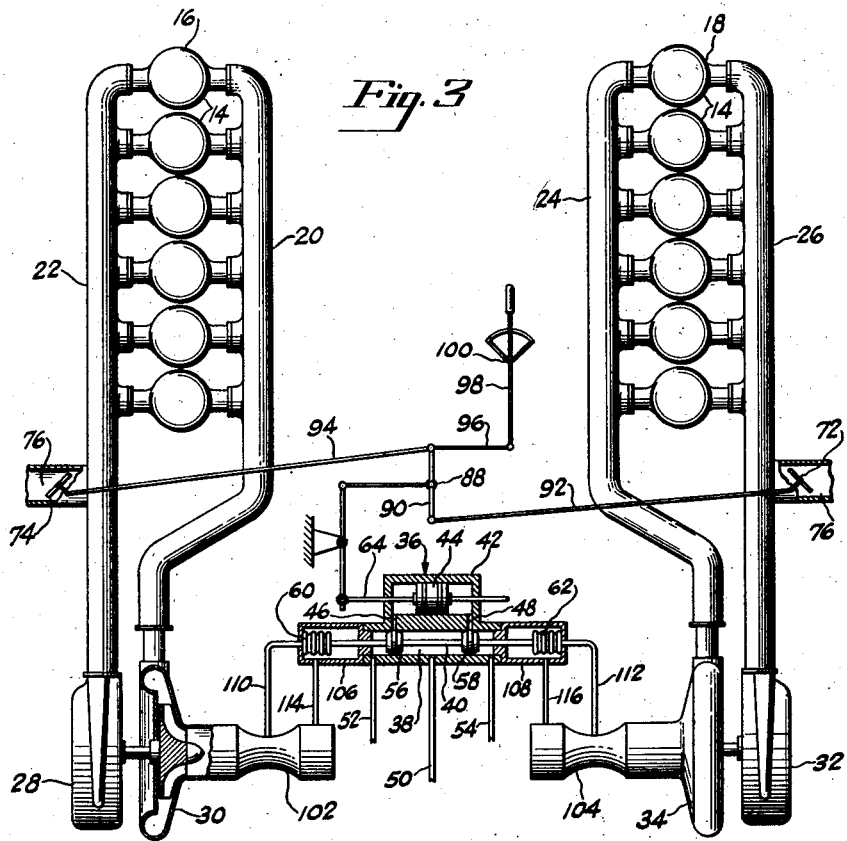
Fig. 3 is a schematic top-plan view of an engine, and a somewhat modified form of control means applied thereto, the control means being broken away and shown in section to better illustrate the construction thereof.

Referring to the drawings in detail, the numeral 10 generally indicates an engine such as a multi-cylinder internal combustion engine having a crankcase 12 enclosing and supporting conventional engine parts and a plurality of cylinders 14 arranged in two groups, as indicated at 16 and 18. Each group of cylinders is provided with an intake and an exhaust manifold, the intake manifold for the group 16 being indicated at 20 and the exhaust manifold at 22, while the intake manifold for the group 18 is indicated at 24 and the exhaust manifold at 26. Each manifold is connected to each cylinder in the respective group by suitable intake or exhaust stacks or conduits.

In the form of the invention illustrated in Fig. 1 each of the exhaust manifolds is connected with a turbine which drives a rotary compressor or supercharger connected with the intake manifold of the same cylinder group, the turbine and compressor together constituting a turbine compressor unit for the respective cylinder group. Thus exhaust manifold 22 is connected with the turbine 28 which drives the supercharger 30 connected with the intake manifold 20 and the exhaust manifold 26 is connected with the turbine 32 which drives the supercharger 34 connected with the intake manifold 24. With this construction the residuary energy of the exhaust gases after their discharge from the cylinders is utilized to supply power for supercharging the engine.

In the constructional embodiment of the control means, as illustrated in Fig. 1, a servo-motor, generally indicated at 36, is disposed between the two intake manifolds 20 and 24. The servo-motor may be operated by hydraulic pressure in which case it incorporates a valve chamber 38 enclosing a movable valve member 40, and a cylinder 42 enclosing a reciprocable piston 44, suitable ports, as indicated at 46 and 48, being provided between the valve chamber and the cylinder. Hydraulic fluid under pressure is led to the valve chamber 38 through the centrally disposed conduit 50 and is drained from the chamber through the conduits 52 and 54 disposed adjacent to the ends of the chamber. The valve member 40 is provided with two spaced apart valve pistons 56 and 58 controlling the ports 46 and 48 respectively. The stem portion of the valve member 40 extends through the opposite ends of the valve chamber 38 and is connected at its opposite ends to pressure responsive expansible chamber devices 60 and 62 connected with the interiors of the intake manifolds 20 and 24 respectively.

From the above description it will be observed that if the fluid pressures in the two intake manifolds 20 and 24, are unequal, the pressure responsive devices 60 and 62 will act to move the valve 40. If the action of the pressure responsive devices is to move the valve 40 to the right, as viewed in Fig. 1, incident to a higher pressure in the manifold 20 than in the manifold 24, the piston 44 will be moved to the left, while, if the action of the pressure responsive devices is to move the valve to the left, as viewed in Fig. 1, incident to a higher pressure in the manifold 24 than in the manifold 20, the piston 44 will be moved to the right.

The piston 44 is connected to a rod member 64 which extends at its opposite ends through the respective ends of the cylinder 42 and is connected by suitable means such as the link rods 66 and 68 to valves 70 and 72 respectively controlling the pressure and amount of exhaust gases led to the respective turbines 28 and 32. The valves 70 and 72 control outlets 74 and 76 respectively in the respective exhaust manifolds 22 and 26, positioned ahead of the turbines 28 and 32 so that a portion of the exhaust gases flowing through the manifolds will be diverted from the respective turbines to thereby control the power developed by the turbines and delivered to the respective superchargers 30 and 34. Since the pressure of the air or fuel mixture in the intake manifolds 20 and 24 will be proportional to the power delivered to the respective superchargers, it is apparent that the pressure in the two manifolds can be accurately controlled or balanced by controlling the amount of power developed by the exhaust driven turbines and delivered to the superchargers.

If desired, the exhaust manifolds 22 and 26 may be provided with other outlets, as indicated at 78 and 80 respectively, controlled by valves 82 and 84 either manually or automatically actuated to control the fluid pressure in the two intake manifolds at any particular time. Such a control may be utilized, for example, to control the superchargers of an aircraft engine to maintain the pressure in the intake manifolds of the engine substantially constant at various altitudes at which the aircraft may be flown.

In the somewhat modified form of the invention, illustrated in Fig. 2, the outlets 78 and 80 and valves 82 and 84 are functionally combined with the outlets 74 and 76 and corresponding valves 70 and 72 so that both the automatic and manual control are obtained by adjustment of the same pair of valves. In this arrangement one end of the link 64 is connected to a member 86 which carries a movable pivot 88, the arrangement being such that movements of the rod 64 by the piston 44 will change the position of the pivot 88. A lever member 90 is mounted, intermediate its length, on the pivot 88 and has its ends connected to the valves 70 and 72 by suitable pivotal connection such as the respective link rods 92 and 94. One end of the lever member 90 is also pivotally connected by suitable means such as the link rod 96 with one end of a hand lever 98 mounted intermediate its length upon a fixed pivot 100. With this arrangement the pressure in one of the manifolds, for example, the manifold 26, may be regulated by the manual lever 98. The automatic control means 36 will then function to control the pressure in the other exhaust manifold, such as the manifold 22, to maintain the pressure or flow in the two intake manifolds substantially equalized.

The arrangement illustrated in Fig. 3 operates upon the same principle as that described above except that in the modification of Fig. 3 the control is arranged to maintain equal fluid flow through the two intake manifolds rather than to maintain the fluid pressure in the two manifolds equal. In this latter arrangement each of the superchargers 30 and 34 is provided at its intake with a Venturi tube, as indicated at 102 and 104 respectively.

Each of the expansible chamber devices 60 and 62 is enclosed in a sealed chamber, as indicated at 106 and 108 respectively, and is internally connected with the throat portion of the respective Venturi tube by a suitable conduit, as indicated at 110 and 112 respectively. The chambers 106 and 108 are internally connected by suitable conduits, as indicated at 114 and 116, with the respective Venturi tubes 102 and 104 ahead of the throat portions of the Venturi tubes. With this arrangement each expansible chamber device will contract upon an increase in the flow of fluid through the respective venturi to which it is connected and will expand upon a decrease in such fluid flow. The servo-motor 36 and the linkage between the motor and the valves 70 and 72 is so arranged, as is clearly illustrated in Fig. 3, that, upon a relative decrease in fluid flow through the Venturi tube connected with the automatically controlled supercharger the valve controlling the turbine driving that supercharger will be closed or moved toward its closed position, and upon a relative increase in such fluid flow the valve will be moved toward its open position to control the amount of air supplied by the supercharger in the manner explained above. In the form of the invention illustrated in Fig. 3 the pressure in the two intake manifolds may be manually controlled by a separate set of valves or may be manually controlled by means of a manual control device combined with the same set of valves to which the automatic control is connected, the latter arrangement being shown for illustrative purposes.

Figure 4:
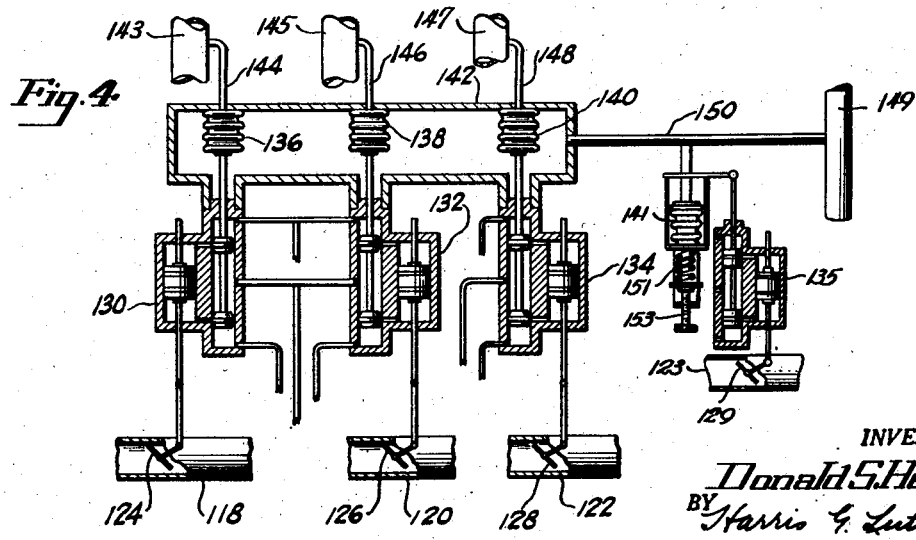
Fig. 4 is a schematic sectional view of the control means arranged to control the fluid pressure in more than two engine intake manifolds.

The arrangement illustrated in Fig. 4 shows an application of the idea of the invention for maintaining equal manifold pressures in more than two manifolds at the same time. This arrangement utilizes one servo-motor and motor-controlling pressure responsive device for each manifold the pressure of which is to be controlled. In the example illustrated there are four exhaust manifolds provided with outlets or by-pass conduits, as indicated at 118, 120, 122, and 123, each controlled by a valve, as indicated at 124, 126, 128 and 129, respectively. The four servo-motors are indicated respectively at 130, 132, 134 and 135, and the expansible chamber devices at 136, 138, 140 and 141. The three expansible chamber devices of the three controlled manifolds 143, 145 and 147 may be disposed in a common sealed container 142 internally connected by means of tube 150 with the interior of the fourth intake manifold 149 which is to be used as the master or control manifold for the group. While the illustration shows a device for controlling three manifold pressures by the pressure in a fourth manifold designated as the master or control manifold, it is to be understood that the device may be extended to control any practical number of controlled manifolds. The interior of each of the expansible chamber devices 136, 138 and 140 is connected to the interior of a respective intake manifold by a suitable conduit, as indicated at 144, 146 and 148 respectively. It is apparent from the above description taken in connection with Fig. 4 of the drawings that any departure of the fluid pressure in a controlled manifold from the fluid pressure in the control manifold will cause a change in the volume of the respective variable volume device which will move the respective valve mechanism to actuate the servo-motor to change the respective control valve 124, 126 or 128 to bring the fluid pressure of the controlled manifolds back to equalization with the fluid pressure in the control manifold. Otherwise the operation of the device, illustrated in Fig. 4, is the same as that described above, the hydraulic fluid under pressure being fed to the servo-motors through suitable conduits and being drained away from the servo-motors through other suitable conduits. The servo-motors themselves are essentially the same as the servo-motors described in connection with Figs. 1 and 3, and the control valve in the exhaust gas by-passes may also be essentially the same as those described above. The automatic pressure responsive control for the manifold 149 may comprise an expansible chamber 141 connected with the interior of the manifold and opposed by an adjustable spring 151 regulated by the manually adjustable screw 153. While this arrangement provides a manually adjustable automatic pressure control for the manifold 149, it is to be understood that even though the pressure in this manifold be manually controlled directly, the pressure in the other manifolds will be automatically controlled according to the invention.

From the above description it will be observed that each engine or each group of engine cylinders having a respective pair of manifolds, including an exhaust manifold and an intake manifold, is provided with an individual controllable turbo-compressor unit and that a simple and effective control mechanism has been provided which will control the operation of the various turbo-units in accordance with some function of the air supply to the respective intake manifolds, such as the pressure in the manifold or the velocity of the air flow supplied to the manifold, to maintain substantially equal air pressures or quantities of air in the various intake manifolds so that the power developed by the various engines or cylinder groups will be maintained substantially equal or balanced.

While there has been illustrated and described in several somewhat varied forms a suitable mechanical embodiment of what is now considered to be the preferred form of the invention, it is to be understood that the invention is in no way limited to the particular constructions so illustrated and described but that such changes in the size, shape and arrangement of parts may be resorted to as come within the scope of the subjoined claims.

Having now described the invention so that others skilled in the art may clearly understand the same what it is desired to secure by Letters Patent is as follows:

1. In combination with a plurality of intake manifolds, individual power actuated means for supplying air under pressure to said intake manifolds, and control means responsive to a function of the air supply to said various manifolds for regulating said individual supply means to maintain the air supply to said various manifolds substantially equalized.

2. In combination with an engine or engines having a plurality of intake manifolds, individual power actuated means for supplying air under pressure greater than atmospheric to said intake manifolds, and control means responsive to the pressure of the air in said various intake manifolds for regulating the power supplied to said individual air supply means to maintain the pressure of the air in said various intake manifolds substantially equalized.

3. In combination with an engine or a plurality of engines having a plurality of intake manifolds, individual means for supplying air under pressure to said intake manifolds, and control means comprising a servo-motor and a pressure responsive device controlling said servo-motor and operatively connected with each of said intake manifolds, responsive to the pressure of the air in said intake manifolds for regulating said individual air supply means to maintain the pressure of the air in the various intake manifolds substantially equalized.

4. In combination with an engine having a plurality of intake manifolds, an individual supercharger for each intake manifold, means controlling each supercharger, a servo-motor for actuating said supercharger control means, and means responsive to fluid pressure in each of said intake manifolds for actuating said servo-motor to maintain the fluid pressure in the various intake manifolds substantially equalized.

5. In combination with an engine having a plurality of intake manifolds, individual superchargers for supplying air under pressure to said intake manifolds, means for regulating the power supplied to said superchargers to regulate the fluid pressure in said intake manifolds, and means operatively combined with said regulating means and responsive to the fluid pressure in each of said intake manifolds for automatically equalizing the fluid pressure in the various intake manifolds.

6. In combination with an engine having a plurality of intake manifolds and a plurality of exhaust manifolds, individual superchargers connected with said intake manifolds, individual exhaust turbines connected with said exhaust manifolds and driving said superchargers, and control means responsive to fluid pressure in each of said intake manifolds for controlling the pressure of the exhaust gases fed to said individual exhaust gas turbines to equalize the fluid pressures in the various intake manifolds.

7. In combination with a plurality of groups of engine cylinders, an intake and an exhaust manifold for each group, a turbo-compressor unit connected to each pair of manifolds, a valve in each exhaust manifold for controlling the operation of each of the respective turbo-compressor units, and control means responsive to the fluid pressure in all of said intake manifolds and operatively connected with the valves in said exhaust manifolds to automatically control the operation of the several turbo-compressor units to maintain the fluid pressure in said intake manifolds substantially equalized.

8. In combination with a plurality of engine cylinder groups, an intake and an exhaust manifold constituting a pair of manifolds for each group, a turbo-compressor unit connected with each pair of manifolds, a valve in each exhaust manifold for controlling the operation of each of the respective turbo-compressor units, control means responsive to the fluid pressure in all of said intake manifolds and connected with the valves in all of said exhaust manifolds for automaticaly controlling said turbo-compressor units to maintain the pressure in said intake manifolds substantially equalized, and manual control means connected between said automatic control means and said valves to raise or lower the manifold pressure maintained in balanced condition in the several intake manifolds by said automatic control means.

9. In combination with an engine having a plurality of cylinder groups, and a pair of manifolds including an intake and an exhaust manifold for each group, a turbo-compressor unit connected to each pair of manifolds, a valve in each exhaust manifold for controlling the operation of the respective turbo-compressor unit, control means responsive to the fluid pressure in all of said intake manifolds operatively connected with said valves for controlling the operation of said turbo-compressor units to maintain the fluid pressure in all of said intake manifolds substantially equalized, a separate manually controlled valve in each exhaust manifold, and means for actuating said separate valves simultaneously to raise or lower the intake manifold pressure.

10. In combination with an engine having a plurality of cylinder groups, and a pair of manifolds including an intake and an exhaust manifold for each group, a turbo-compressor unit connected to each pair of manifolds, means controlling the flow of exhaust gases through each exhaust manifold to the respective turbine, a Venturi tube at the inlet of each compressor, and means connected with said Venturi tubes and responsive to a difference in air flow through said tubes for actuating said exhaust gas flow controlling means to regulate the power supplied to said superchargers.

11. In combination with an engine having two groups of cylinders and an intake and an exhaust manifold for each cylinder group, a turbo-compressor unit connected to the manifolds of each cylinder group, means for differentially controlling the operation of said turbines, and means responsive to a function of the air supply in said intake manifolds to actuate said turbine controlling means.

12. The method of maintaining equal fluid pressures in two or more manifolds which comprises, supercharging said manifolds by individual power driven superchargers, and utilizing pressure differences between separate manifolds to differentially control the power input to said superchargers.

13. The method of maintaining equal fluid flow in two or more manifolds which comprises, supercharging said manifolds by individual power driven superchargers, automatically comparing the velocity of fluid flow into said manifolds, and utilizing differences in the rate of fluid flow into said several manifolds to differentially regulate the power input to the respective superchargers.

DONALD S. HERSEY.